May 9, 1939.    C. W. LANTER    2,157,765
METHOD OF BALING
Original Filed July 8, 1931    7 Sheets-Sheet 1

May 9, 1939. C. W. LANTER 2,157,765
METHOD OF BALING
Original Filed July 8, 1931 7 Sheets-Sheet 2

May 9, 1939. C. W. LANTER 2,157,765
METHOD OF BALING
Original Filed July 8, 1931 7 Sheets-Sheet 5

Patented May 9, 1939

2,157,765

UNITED STATES PATENT OFFICE 2,157,765

METHOD OF BALING

Clarence W. Lanter, Chicago, Ill.

Application July 8, 1931, Serial No. 549,399
Renewed November 23, 1936

14 Claims. (Cl. 100—1)

The present invention relates to methods of baling, and is particularly concerned with the baling of spring units for mattresses, complete mattresses, cushions or the like.

It should be understood, however, that the present methods are not limited to the baling of any particular commodity and many of the features of the invention are of general application and the invention may be utilized for baling other forms of compressible raw material, merchandise, cushions, etc.

The present application relates to improved methods of the same general type disclosed in my prior application, Serial No. 428,287, filed February 14, 1930, now Patent No. 1,988,692, issued January 22, 1935, and is a continuation in part of said prior application.

Among the devices which can be handled by the present baling methods, are spring units used in the manufacture of mattresses or cushions, and usually comprising casings of burlap or other fabric having a plurality of separate spring chambers formed therein, in such manner that the springs are enclosed and supported in definite relation to each other in the casing.

These spring units are preferably provided with spiral coil springs having coils which decrease in diameter toward the center of the unit, with the largest coils at each end of the spring. The present machines are also peculiarly adapted to bale finished mattresses made out of such spring units, and bales may be made of a single mattress or a plurality of mattresses.

One of the objects of the present invention is the provision of an improved baling method which is adapted to be carried on continuously in the baling of resilient units or mattresses, and which is adapted to complete the finished bales without the loss of time or expense which is involved in the baling methods of the prior art.

Another object is the provision of an improved baling method which is adapted to bale spring units or mattresses without the necessity for the preliminary step of sewing the units end to end, thereby eliminating the loss of time and expense involved in the latter operation.

Another object is the provision of an improved baling method in which the springs are compressed in substantial alignment with the axis of the springs, and undesirable distortion of the springs during the baling operation is prevented.

Another object is the provision of a novel method of forming improved bales, having very desirable characteristics for the purpose of storing or shipping finished mattresses, by means of which the mattresses may be handled more economically, preserved in better condition for long periods of time, and stored more compactly.

Other objects and advantages of the invention will be apparent from the following description, and from the accompanying drawings, in which similar characters of reference indicate similar parts throughout the several views.

In order to show one form of apparatus for carrying out the method and to show the product resulting therefrom, the machines and bales made thereby have been described and shown in the accompanying drawings and this specification.

Referring to the drawings, of which there are seven sheets;

Fig. 3 is a view similar to Fig. 1, of another form of my baling machine employing a different form of compressor for gradually compressing the mattress or spring unit prior to, or during, the baling operation;

Fig. 4 is another view similar to Fig. 1, of a modified form of baling machine, with a different type of compressor and a modified baling drum arrangement;

Figures 1, 10:
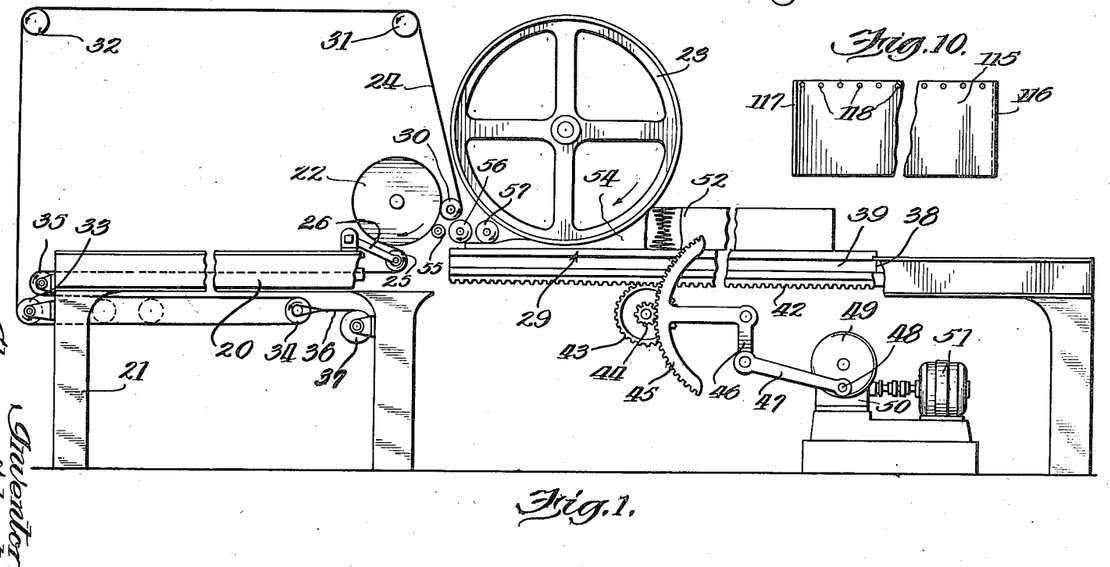
Fig. 1 is a diagrammatic, side elevation in partial section, of one of my improved baling machines employing a reciprocable table and large compressing cylinder.
Fig. 10 is a fragmentary view of the covering used in packaging the mattresses according to Figs. 8 and 9.
Figure 2:
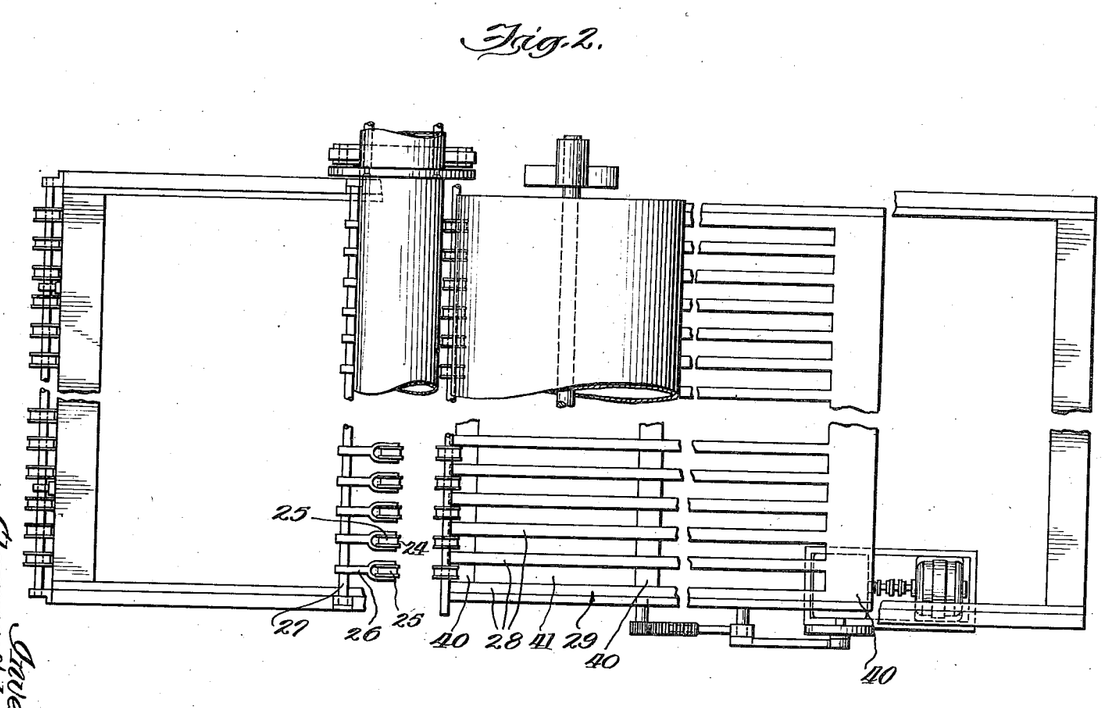
Fig. 2 is a plan view of the machine of Fig. 1.

Referring to Figs. 1 and 2, these are diagrammatic illustrations of baling machines of the same general type disclosed in my prior application, and consequently all of the details of the machine need not be described in full. It should be understood that some of the baling machines constructed according to the present invention, or according to my prior application, need not include all of the features disclosed in these applications, and every machine need not be equipped with a stripping device. The necessity for a stripping device depends upon the friction of the finished bale on the baling drum, and this in turn depends on the extent to which the spring units or mattresses or other merchandise are compressed, and to some extent upon the amount of merchandise placed in the bale. When a single mattress or a small number of units are baled, and the pressure exerted by the bale on the drum is not such as to produce excessive friction, the compressed mattress may be slid off the baling drum by hand, thereby eliminating the necessity for stripping devices on the small and more simple machines.

It should be understood, however, that a stripping device of the type illustrated may be utilized in any of the machines described in this or my prior application.

Each of the baling machines described herein, preferably includes a provision for gradually compressing the spring units or mattresses to a predetermined thickness, after which the compressed mattress is preferably rolled upon a baling drum, the state of compression being maintained at substantially the same pressure, but in baling according to some of the methods described herein, the pressure may be slightly released as the compressed material is fed about the baling drum, thereby permitting the springs or other resilient units to assume a better position or to adjust themselves within the finished bale to a position of substantial alignment.

Referring to Fig. 1 the frame 20 of this machine is preferably provided with a plurality of legs 21 and with suitable bearing supports for rotatably supporting a baling drum 22, and a compressing drum 23. The baling drum may be similar in construction to the one described in my prior application, but in the present machine, the baling drum is mounted for rotation and for a movement away from the compressing drum 23, according to the detailed disclosure of Fig. 4. It is necessary that provision be made for the increase in size of the drum with the mattresses or spring units, or portions thereof, as the baling operation proceeds, and therefore various forms of movably mounting the drum 22 may be employed.

In some embodiments of the invention, the mattress or spring unit indicated in its entirety by the numeral 52, may be grasped by suitable devices carried by the drum 22, and drawn about the drum 22 under such tension longitudinally of the mattress as to maintain the state of compression. In such case the state of compression is directly maintained by the compression exerted on the springs or other units, by the outermost layers of fabric, and in such case I may dispense with the compressing belt which is shown in the machines illustrated. In the majority of instances, however, it is undesirable to place any undue tension upon the covering of the spring units or mattresses, and therefore the drum 22 is preferably provided with means for maintaining the state of compression of the mattress or spring unit 52, which means may consist of any of the devices disclosed in my prior application, or one or more belts 24.

In some embodiments of the invention, the belts are so arranged that a single wide belt is capable of maintaining the state of compression, but in the present embodiment, the belt 24 preferably consists of a multiplicity of separate belts supported on separate rollers 25 in spaced relation to each other upon the arms 26. The arms 26 are mounted on a shaft or bar 27 in such position that the rollers 25 with the belts 24, are adapted to be received between the frame members 28 of a reciprocating table indicated in its entirety by the numeral 29.

The belts 24 preferably consist of endless belts which may be supported upon a plurality of rollers or pulleys 35 to 35, in addition to the rollers 25 and drum 22.

The pulleys 25 and 30 are preferably located so as to pull the belts 24 about substantially the major portion of the periphery of the drum 22 to maintain the mattress under compression on the drum 22 while the pulleys 31 to 35, inclusive, are suitably carried by the frame 26 in such manner as to provide the return path for the belt 24. Thus, the belt 24 passes about the left side of drum 22 in Fig. 1, under pulley 30, over pulleys 31, 32, under pulley 33, about the right side of idler pulley 34 about the left side of pulley 25, and about the right side of pulley 25.

The idler pulley 34 is also illustrated in a plurality of alternative positions in Fig. 1, and this idler pulley may be supported by a plurality of cables 36 wound upon spring actuated drums 37 to maintain the belts 24 under a predetermined tension or the idler pulleys 34 may be supported on a rack which engages a pinion having a braking apparatus or any other suitable form of tension maintaining device.

The tension maintaining devices described in this or my prior application may be utilized in any of the machines illustrated herein, and such tension devices are also preferably provided with means for releasing the tension, so that the belts 24 may be released when it is desired to strip the bale from the drum 22.

The frame 20 is preferably provided with suitable guides 38 for slidably receiving complementary guide members 39 carried by table 29, and the table 29 comprises a movable framework slidably mounted on the frame 20 and adapted to support a mattress or a unit 23 during the compressing operation. In the embodiment illustrated in Fig. 2, the table 29 comprises a plurality of longitudinally extending frame members 28 secured together in spaced relation by a plurality of transversely extending frame members 40, thereby leaving spaces 41 between the longitudinal frame members 28 for receiving the pulleys 25 with the belts 24. This permits the table 29 to move to a position directly below the baling drum 22, and permits the mattress or other unit to be seized by the mechanism surrounding the drum 22 before the support of the reciprocating table 29 is withdrawn.

The table 29 is provided with one or more racks 42 adapted to engage the gear 43, which is actuated by pinion 44, engaging gear sector 45. Gear sector 45 is oscillated back and forth by a bell crank 46 connected to connecting rod 47 which is reciprocated by the crank pin 48 upon rotating member 49. The casing 50 contains a suitable gear reduction and clutch devices for controlling the reciprocation of the table 29 at suitable speeds whenever the operator desires to cause the table to feed a mattress to the drum 22.

It should be understood that the baling drum 22, belts 24, compressing drum 23, and table 29 may all be actuated from the same motor 51 by means of appropriate drive belts or gearing, with suitable clutches interposed as described in my prior application, so that any of these devices may be actuated separately at predetermined speeds.

The compressing drum 23 is preferably of sufficient size so that the mattress 52 is gradually compressed between the periphery of drum 23 and the surface of reciprocating table 29. The space 54 between the compressing drum 23 and table 29 forms a gradually tapering aperture into which the mattress 52 is fed as the table 29 is moved to the left, and the drum 23 is rotated and the mattress 52 is gradually compressed from the size shown at the right in Fig. 1, to the size shown at the left. The amount of compression may be varied without departing from the scope of the invention, and will depend upon the compressibility or resilient qualities of the units to be baled, but it should be understood that in general, the bale should be made as compact as possible in order to save space in the storing and shipping of the baled units.

In order to fill in the space between the compressing drum 23 and the baling drum 22, a plurality of auxiliary rollers 55, 56 and 57 may be provided for engaging the mattress 52 and maintaining the state of compression until the left end of the mattress 52 in Fig. 1 is received between the belts 24 and the baling drum 22.

The operation of the present machine is as follows:

The table 29 is preferably long enough to support the whole length of the mattress 52 and the table 29 is periodically reciprocated back and forth underneath the drums 22 and 23. When a mattress is located on the table 29, the selective control devices in the casing 60 are actuated either by hand or automatically, so that the table 29 is moved to the left underneath the drum 23. The table 29 and drum 23 compress the mattress and feed it between the rollers 25 and drum 22, where the mattress is carried about the drum 22 by the belts 24. The mattress is wrapped in one or more spiral layers similar to Figs. 8 and 9 about the drum 22, and the state of compression is maintained by the belts 24.

As the mattress 52 is wrapped around the baling drum 22, the reciprocating table 29 is received between the separate pulleys and belts 25, and the length of the table 29 should, of course, be such as to support the mattress 52 until the complete mattress is wound on the baling drum 22.

Referring to Fig. 3, this is another form of apparatus in which the baling drum 22 is supported in the same manner as Figs. 1 and 4. The belt 24 of this embodiment is supported on similar pulleys or rollers 25 and 30, 31, 32 and 34, inclusive, but the belt arrangement of Fig. 3 requires additional rollers 58, 59. The frame 20 includes a supporting table 60, which is provided with suitable vertical guides 61', similar to the horizontal guides described with respect to Fig. 1. The frame 20 also includes bearings having a plurality of rollers 61 located in spaced relation to the vertically movable table 60, and the table 60 rotatably supports a plurality of rollers 62.

The rollers 61, 62 may in some embodiments be replaced by unitary belts suitably supported and maintained in position by a lesser number of rollers, if desired, and the belt 24 in the present embodiment may consist of a unitary belt of sufficient width to engage the mattress or a multiplicity of separate belts. The necessity for separate belts is not present in this embodiment as in Fig. 1, for the reason that the reciprocating table of Fig. 3 merely acts to compress the mattress or unit 52, and does not move to a position between the parts of belt 24.

The frame 20 also preferably extends to the right of the rollers 62 and is provided with a table portion 63 having a plurality of rollers 64 for supporting the mattresses or units 52 before they are fed between the rollers 61 and 62.

The movable table 60 is preferably pivotally connected to links 65 which are connected to crank arms 66 on shafts 67 and actuated by bevel gears 68, 69 on shafts 67 and 70, respectively. The shaft 70 may be actuated by a suitable motor, gear reduction device and clutch as described in Fig. 1, or the shaft 70 may be actuated by suitable gears 71 and 72 and a hand crank 73.

The operation of the device of Fig. 3 is as follows. A mattress or other unit is placed upon the roller 64, the rollers 61 and 62 being in the position shown in Fig. 3. The rollers 61, 62, 64 may be driven by suitable belts or gears, or the mattress may be fed in by hand between the rollers 61, 62 to the position of Fig. 3, after which the shafts 67 may be rotated in such manner as to cause the cranks 66 to rise, forcing the links 65 upward and raising the table 60.

The mattress 52 may then be compressed between the rollers 61, 62 to a fraction of its former thickness, and it should be noted that as the links 65 and 66 approach the final position, the force exerted by these toggle links becomes much greater, enabling the operator to accomplish the final compression without excessive effort. In most resilient units, the amount of force required for compression increases with the degree of compression, and therefore the mechanism should be so arranged as to give a greater force multiplying effect at the end of the compressing movement, with approximately the same amount of effort expended in performing this work.

The compressed mattress is then fed between the baling drum 22 and auxiliary feeding roller 74, and thence between the belt 24 and baling drum 22, and wound about the baling drum 22, while the compression is maintained by means of the belt 24. In Fig. 3 one mattress has already been wound about the drum 22, and in some packages, this represents the completion of the winding operation, but it should be understood that if desired, any number of mattresses may be placed in a bale, depending upon the size of the bale desired and the size of the individual mattress.

Referring to Fig. 4, this is another modification in which the compressing table has been reversed from the arrangement shown in Fig. 3, and the movable support for the drum 22 is shown in detail. In this embodiment, the frame 20 includes a plurality of rollers 75 supported in substantial alignment with the lower side of the periphery of baling drum 22. The frame 20 includes a plurality of vertically extending guides 76 for slidably supporting the compressing table 77, which carries a plurality of rollers 78.

The actuating mechanism for the compressing table 77 may be substantially the same as that described with respect to Fig. 3, except that the table 77 is forced downward with respect to rollers 75 to bring the mattress to a state of compression.

The frame 20 also includes a plurality of diagonally extending guides 79 which are arranged to permit movement of the drum frame 80 in a direction away from the level of the rollers 75 and from proximity to the compressing table 77. The guides 79 therefore extend upward and to the left in Fig. 4, so that the baling drum 22 may move outward from the rest of the machine as the size of the bale increases. The drum frame 80 also includes a plurality of rollers 81, 82, 83 for rotatably supporting the drum 22, as described in my prior application, and with a plurality of rollers 25, 30 for supporting the belt 24 about the baling drum 22. The auxiliary rollers 84, 85, 86, 87 are fixedly supported on the frame 20 to feed the compressed mattress 52 to the baling drum 22. One mattress 88 has already been compressed and is partially wrapped around the drum 22 in Fig. 4.

The operation of this modification is substantially the same as those previously described, except that the compressing table moves downward to compress the mattress, but the movement of the baling drum may be the same in all the modifications described.

Figure 5:
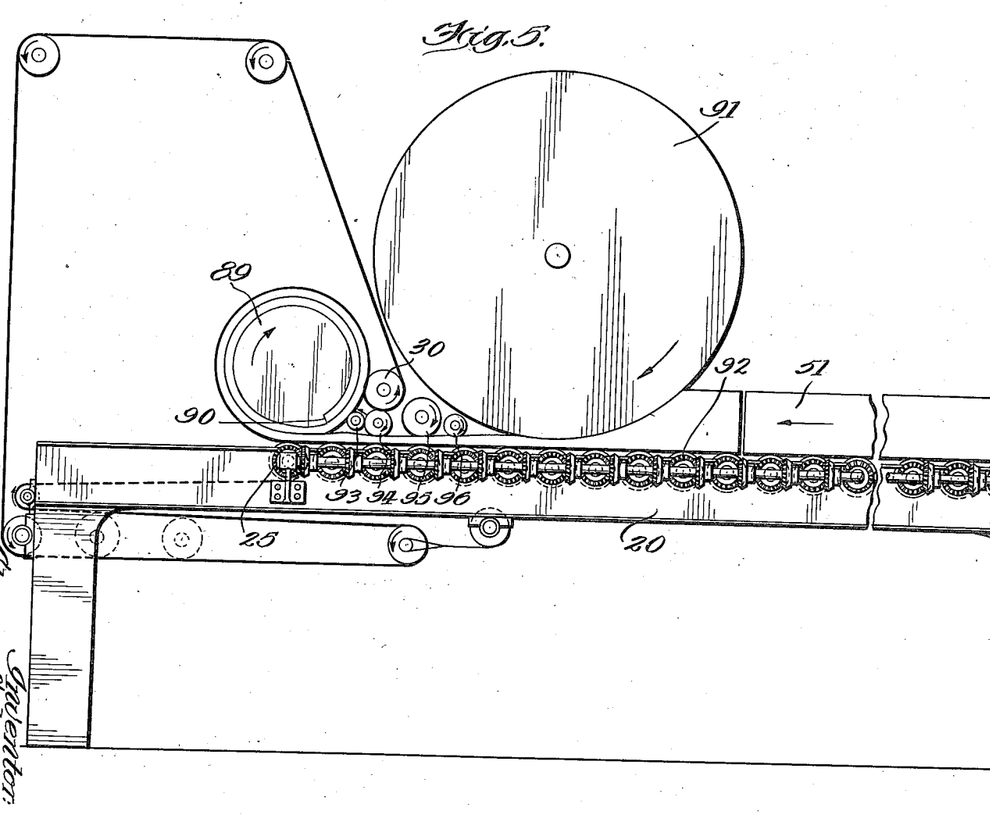
Fig. 5 is a similar view of another modified form of baling machine employing a large compressing cylinder for gradually compressing the spring units or mattresses.

Referring to Fig. 5, this is another modification in which the machine is provided with a similar baling drum 89 of a different shape.

The baling drum 89 takes the shape of a spiral having a definite shoulder 90 extending longitudinally of the drum at one side. The depth of the shoulder 90 is substantially equal to the thickness to which the mattress is to be compressed, and this maintains the mattress in a predetermined shape and avoids the undue compression of the end of the mattress.

The compressing drum 91 in this embodiment, is a large drum capable of gradually compressing the mattress 51 and the frame 20 of the table rotatably supports a multiplicity of rollers 92 in position to cooperate with the baling drum 89 and compressing drum 91. The auxiliary rollers 93, 94, 95 and 96 may be provided to bridge the gap between the two drums, and all of the rollers 92 may be driven by bevel gears, as illustrated, or a predetermined number of rollers may be driven.

In some embodiments, belts will be preferred instead of gears, in order that a predetermined amount of slippage may occur between the rollers and the belts to prevent injury to the mattress.

Figures 6, 7:
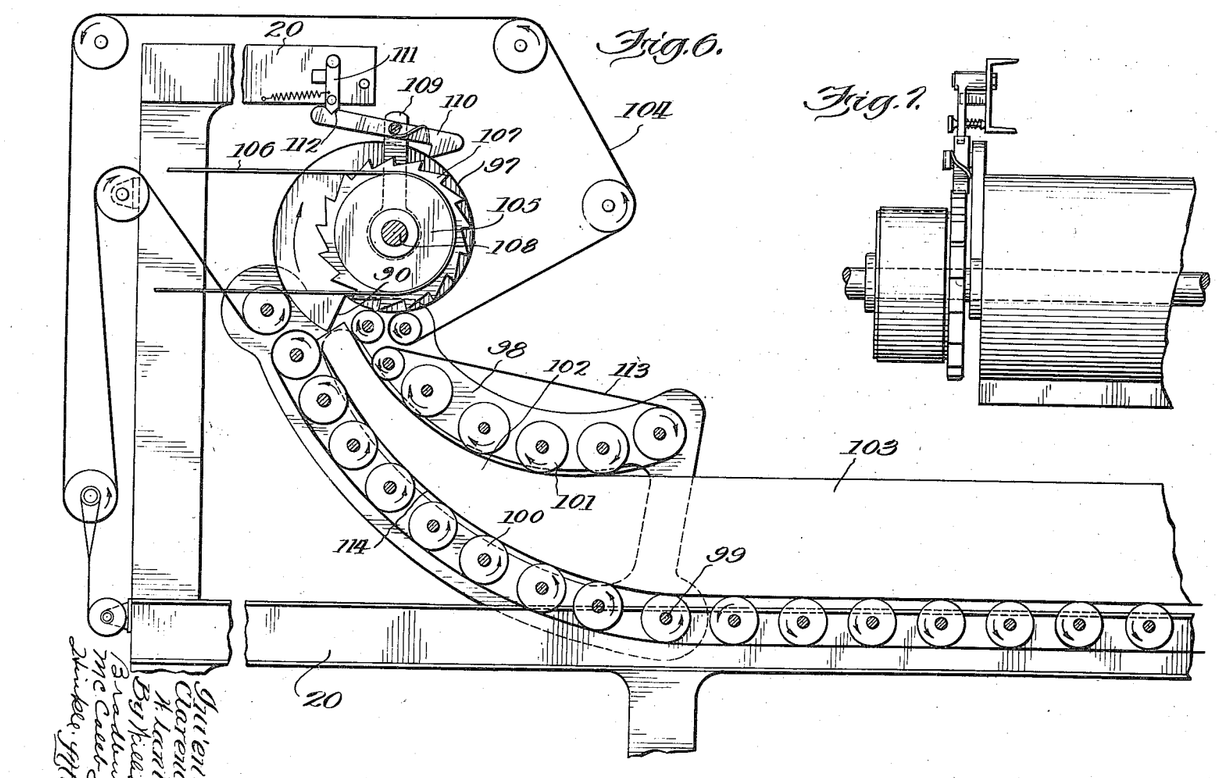
Fig. 6 is a fragmentary view of another modification of the baling machine and the compressor, in which the spring units or mattresses are gradually curved during the compressing operation.
Fig. 7 is a fragmentary, elevational view of the drum and tripping arrangement for starting the baling operation, with the drum in the same position as Fig. 6.

Referring to Fig. 6, this is another modification in which the machine is adapted to effect a gradual compression and wrapping of the mattress simultaneously. It is highly desirable that the springs of a spring unit or mattress be maintained under substantially axial compression, and great difficulty is encountered in maintaining this axial compression while wrapping the mattresses or units about a relatively small baling drum. Consequently, it has been found desirable to arrange the compressing rollers with or without belts in the form of a spiral of gradually increasing curvature or decreasing radius, so that the curvature of the mattress is effected gradually and the inner layer of the mattress may be compressed without placing undue tension on the outer layers of the mattress.

In the device of Fig. 6, the drum 97 is rotatably supported upon the frame 20 and preferably consists of a spirally curved drum formed with the shoulder 90. In this embodiment, the frame 20 movably supports a second frame 98, which may be pivotally mounted at the point 99, and which carries a plurality of compressing rollers 100, 101.

The frame 98 is provided with bearings which support the rollers 100 and 101 to form a gradually tapering opening 102 between the rollers, and the opening 102 curves spirally toward its end so that the mattress is gradually curved as it is compressed between the rollers 100, 101. This curvature continues as the mattress 103 passes about the spiral drum 97, and as the size of the bale increases, the frame 98 may pivot downward from the drum 97 against the tension of the belt 104, which is provided with the usual idlers or belt tightening devices previously mentioned.

The present apparatus is preferably provided with devices for setting the drum 97 in a predetermined position, since the first mattress should abut against the shoulder 90 on the drum 97, and these devices are illustrated in Figs. 6 and 7.

The pulley 105 is driven by a belt 106, or other suitable means, and the pulley 105 has a direct connection to the ratchet wheel 107. The drum 97 is rotatably mounted on the shaft 108 and directly connected to the arm 109, which carries a pawl 110. Pawl 110 is maintained in the position shown in Fig. 6 by engaging a latch 111, the end of which is located in a camming groove 112.

In beginning the baling operation, the device is set as shown in Fig. 6, and the mattresses are fed between the rollers 100 and 101 until the end of the first mattress hits the shoulder 90 of the spiral drum 97. The mattress then causes the drum to rotate because the mattress is positively fed against the shoulder 90, and the rotation of the drum carries the arm 109 in a clockwise direction, the groove 112 of pawl 110 riding over the point of latch 111. The pawl 110 is forced into engagement with the teeth of ratchet 107 by its spring and the rotating ratchet wheel 107 thereafter carries the drum 97 with it and positively wraps the mattress or other unit on the drum. The drum is stopped when one or more mattresses have been wrapped upon it, and the finished bale is removed and therefore the latching devices shown in Fig. 6 may be set by hand at the beginning of each baling operation.

It should be noted also that the rollers 101 may be covered by a belt 113 and the rollers 100 may be covered by a belt 114. The belt 114 tends to extend directly from one outermost roller to the other, but it is forced into engagement with the rollers 100 by the mattress 103 during the compressing operation. The intermediate rollers 100 reinforce and support the belt 114. It should also be noted that the frame 98 may be pivotally mounted or slidably mounted.

Referring to Fig. 10, this is a plan view of a metallic covering which may be used as a temporary enclosure for the bale during the stripping operation, or which may also be used as a permanent casing. The member 115 comprises a piece of sheet metal, such as steel, having oppositely directed hooks or grooves 116, 117 at its opposite ends. The sheet metal member 115 may also be provided with a plurality of holes 118 along one edge, for a purpose further to be described. This member may also be made of flexible cardboard or fabric, with suitable securing devices, when it is to be used as a shipping casing.

Figure 8:
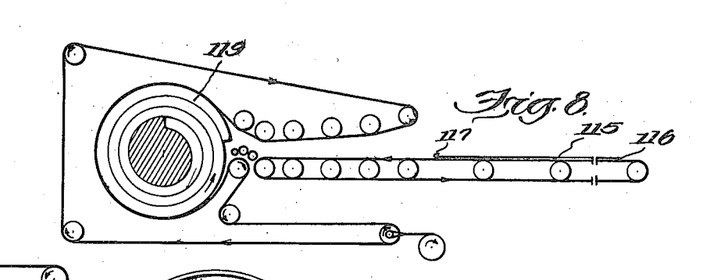
Fig. 8 is a diagrammatic side elevational view of the apparatus showing the mode of application of an enclosing cover either for the purpose of temporarily maintaining the spring unit or mattress under compression, or for forming a permanent package.
Figure 9:
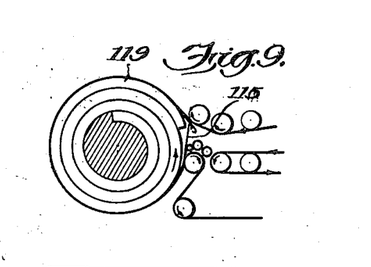
Fig. 9 is a similar fragmentary view of another step in packaging the compressed bale.

Referring to Fig. 8, this is a digrammatic view showing a mattress completely wrapped, and the sheet metal covering 115 may be placed upon the belts or rollers and fed about the compressed and baled mattress 119. The length of the flexible sheet metal member 115 is such that the hooks 116, 117 are in approximately the proper position to engage each other, and when the tension is released on the belt surrounding the bale, the hooks 116, 117 come into engagement and hold the bale under compression. The bale may then be removed from the drum and shipped in the casing 115, if desired, but in most embodiments of the invention, it will be preferable to merely utilize the metallic casing 115 as a temporary device for maintaining the compression during the stripping operation.

Figure 11:
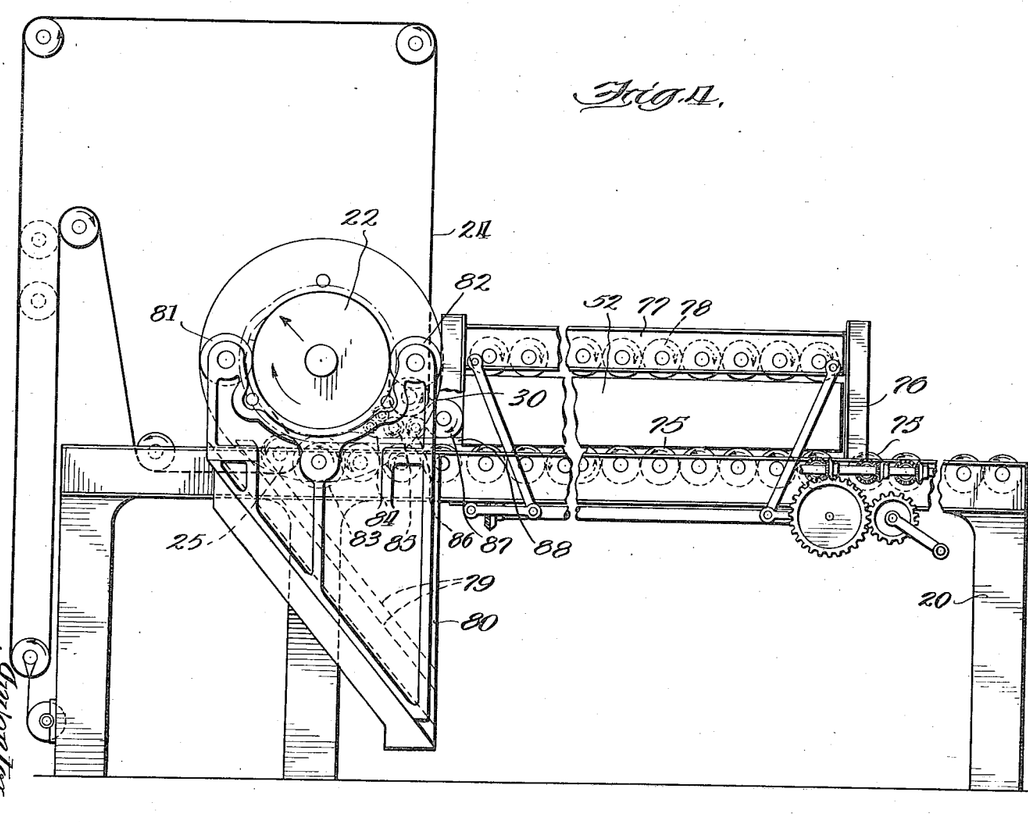
Fig. 11 is a side elevational view with a package in section, showing the baling drum and bale with one form of package or container applied to the bale just before the stripping operation.

Referring to Fig. 11, one form of stripping device is illustrated in this figure, and this stripping device may include the annular member 120 for engaging the mattress and forcing it off the drum 22. The other details of the stripping device may be exactly as described in my prior application, except for the fact that the stripping device includes an annular supporting member 121 with a multiplicity of spring pressed plungers or pins 122. The plungers or pins 122, or some of them, engage in the apertures 118 in the sheet metal sleeve 115, and when the sheet metal sleeve 115 has its hooks 116, 117 engaged, the sleeve 115 is prevented from moving axially, by the pins 122. The stripping ring 120 may then be operated to push the mattress 52 off the drum 22 into containers of various kinds, after which the pins 122 may be drawn into the ring 121 by the camming slots 123, which engage the pins 124 carried by plungers 122. The plungers 122 are withdrawn by grasping handle 125 and rotating the camming ring 126.

Figures 11, 12, 13, 14, 15:
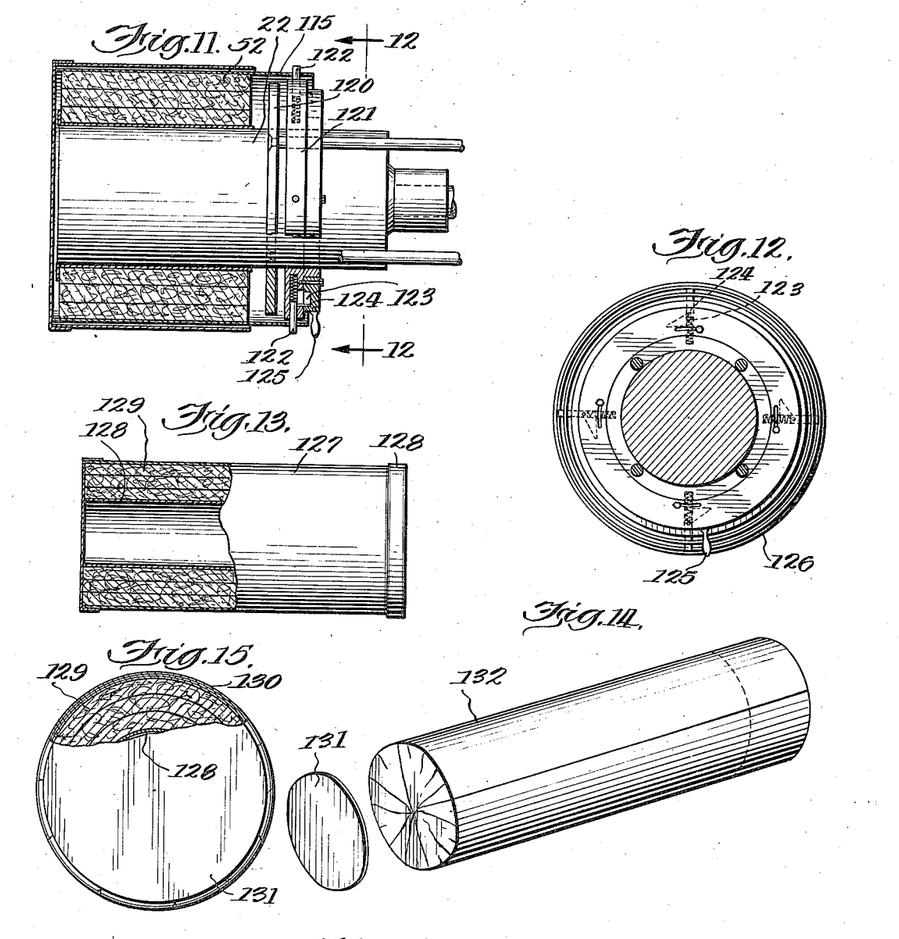
Fig. 12 is a sectional view taken on the plane of the line 12—12 of Fig. 11.
Fig. 13 is an elevational view in partial section, showing the construction of one of the finished bales made according to the disclosures of Figs. 11 and 12.
Fig. 14 is a view in perspective of another form of bale, partially completed, with the end covering in spaced relation to the end just before its application to the end of the bale.
Fig. 15 is a sectional view taken through a finished bale of the type shown in Fig. 14, transversely to the axis of the bale.

Referring to Fig. 13, this is an illustration of one of the improved forms of bales which may be made according to the present methods with the machines illustrated. It should be understood, however, that all of the parts of the bale of Fig. 13 need not be included in every embodiment of the invention.

The bale of Fig. 13 preferably includes an outer cylindrical container 127 formed of cardboard or paper and provided with covers 128 at each end. The container 127 is larger than the metal sleeve 115 and may be slid over the metal sleeve 115 in Fig. 11, when the compressing belt has been released.

In the preferred form of the invention, a second container 128 comprising a relatively stiff cardboard member of cylindrical shape, is located inside the coils of the mattress 129. In order to confine the compressed mattress in cylindrical shape, it is only necessary to provide the external casing, but as the mattress is stripped from the drum 22, the innermost coils of the mattress tend to expand to fill up the opening formerly occupied by the drum 22. This deforms that portion of the mattress, and such deformation is considered undesirable by some mattress manufacturers.

Such expansion of the innermost portions of the mattress 129 may be prevented by the inner cylindrical member 128, which may be located on the drum 22 prior to the wrapping of the mattress on the drum, or the drum 22 may be hollow and open at one end so that the inner casing member 128 may be located inside the drum 22.

In either case, the stripping member 120 is adapted to move the mattress 52 axially off the drum 22 and out of the sleeve 115. As the mattress progresses off the drum and out of the sleeve, it is received in the container 127 and upon the cylindrical drum 128, against which the mattress expands, but due to the friction between the respective coils of the mattress, it is possible to maintain the mattress in compressed position by materials of relatively low tensile strength. The covers may then be placed on the ends of the container 127, forming a compact cylindrical package which does not require any ropes, nails or other fastening devices and which can be constructed at a very low cost.

Another form of package is shown in Fig. 14, in which a sheet of paper is fed about the mattress after the wrapping operation has been completed, and the paper sheet preferably extends about the bale a plurality of times, after which the end 130 along the length of the roll is glued, cemented or otherwise secured in place. The ends of the tubular paper member, which project beyond the bale, may be folded down in a radial direction, as shown in Fig. 14, when the bale has been stripped from the machine, and the ends may be protected by gluing, cementing, or otherwise securing an end piece 131 of paper or cardboard on each end of the bale 132.

This bale also presents very desirable characteristics from the point of view of compactness, shipment, prevention of damage to the mattress, and maintains the mattress in good condition, and may be constructed even more cheaply than the one previously described, on account of the use of ordinary sheet paper.

Figure 16:
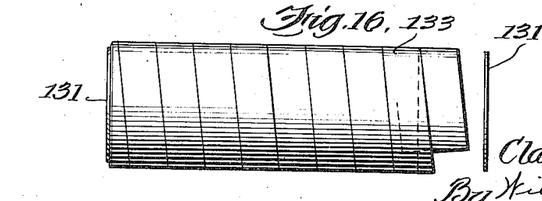
Fig. 16 is an elevational view of another form of helically wrapped bale, partially completed.

Referring to Fig. 16, this is another modified package in which one or more strips of paper may be wound spirally in overlapping relation to form a sufficient number of layers on the mattress to maintain the mattress under compression. The number of layers of paper will depend upon the width of the strip and the amount of overlap, and for instance, three layers may be made by using an overlap of two-thirds the width of the strip. The spiral paper covering should be extended slightly beyond the ends of the package and the excess should be folded in in a radial direction and covered with end pieces 131, which simultaneously finish the ends of the package and secure the ends of the spiral strip 133.

The present apparatus may be provided with the driving devices for the compressing rollers or belts, and the baling drum described in my prior application, but a number of different methods of baling may be carried out by changing the speed relations of the driving devices, and in some cases eliminating the drives of various parts. Since the inner side of any coil of a mattress must be shorter than the outer side, it is necessary to compress the inner surface of the mattress, and unless a suitable compression is attained on the inner side of the mattress as it is wrapped on the baling drum, there will be a corresponding degree of tension in the outer covering of the mattress. This results in the inner covering of the mattress on the drum lagging behind the outer part of the mattress unless suitable provision is made to maintain the springs in a substantial position of alignment.

The present apparatus is capable of carrying out a number of different methods of baling merchandise, the preferred method varying according to the physical characteristics of the merchandise to be baled. In the embodiments of Figs. 1, 3, 4, 5 and 6, there are four variable factors which may be controlled in different manners and operated at different speeds to change the method of manipulation of the raw material. These factors are (1), the baling drum, (2) the compressing and feeding rollers or belts which engage the inside of the mattress as it coils on the drum, (3) the compressing and feeding rollers or belts which engage the outside of the mattress as it is wrapped on the drum, and (4), the belt or roller surrounding the baling drum and maintaining the raw material under compression during the baling operation.

In the first place, it should be understood that in the more simple embodiments of the invention, certain of these factors may be omitted, depending on the results sought to be accomplished. In the second place, there are a number of modes of actuation of each of the variable factors mentioned, and any one or any combination of these devices may be driven positively by means of gearing, or flexibly driven by means of belts which have a tendency to slip.

It should be understood that when a spring unit or a mattress is baled, as shown in Figs. 11 to 16, the springs and other materials are in a state of compression, and a considerable amount of potential energy is present in the bale. These highly compressed springs exert powerful forces in a radial direction, but the inner spiral coils are restrained against movement by the next outer spiral coils, and by the friction which would be generated if the respective wrappings of the mattresses were permitted to slide relative to each other in the unwrapping operation, and it is therefore possible to hold the springs in such a state of high compression by a relatively light wrapper of paper, burlap or other material.

Having thus described my invention, what I claim is new and desire to secure by Letters Patent of the United States, is:

1. The method of packaging a mattress or the like, comprising compressing the mattress and wrapping it spirally on a drum, positioning an external container for slidably engaging the exterior of a bale on the drum, applying said container to said bale and sliding the baled mattress axially out of said container and off said drum into a complementary container, into which the baled mattress expands.

2. The method of baling spring units for mattresses, which comprises successively compressing a plurality of spring units to a fraction of their normal thickness, while maintaining the spiral turns of the springs in substantially axial alignment with each other, rolling said units successively upon a drum under compression, rolling a wrapper about the outer surface of said spring units, and securing the ends of said wrapper together.

3. The method of baling spring units for mattresses, which comprises successively compressing a plurality of spring units to a fraction of their normal thickness, while maintaining the spiral turns of the springs in substantially axial alignment with each other, rolling said units successively upon a drum under compression, rolling a wrapper about the outer surface of said spring units, hooking the ends of said wrapper together, and releasing the compression on said bale to effect expansion of said bale and firm securement of said wrapper.

4. The method of baling spring units for mattresses, which comprises successively compressing a plurality of spring units to a fraction of their normal thickness, while maintaining the spiral turns of the springs in substantially axial alignment with each other, rolling said units successively upon a drum under compression, rolling a wrapper about the outer surfaces of said spring units, hooking the ends of said wrapper together, releasing the compression on said bale to effect expansion of said bale and firm securement of said wrapper, and pushing said bale from said drum.

5. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, and wrapping said units successively one after the other spirally upon a supporting member while maintaining a radial compression upon the outermost of said units.

6. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, and wrapping said units successively, one after the other, spirally upon a supporting member while maintaining a radial compression upon the outermost of said units, and wrapping a covering upon said units to secure said units in a state of compression by virtue of said covering and by virtue of the friction of said units against each other toward sliding and unwrapping.

7. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, wrapping said units successively, one after the other, spirally upon a supporting member while maintaining a radial compression upon the outermost of said units, and placing a retaining covering on said wrapped units and releasing the radial pressure upon said units to place outward pressure upon said retaining covering and secure said covering in part by effecting a binding between the parts of said covering.

8. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, wrapping said units successively, one after the other, spirally upon a supporting member while maintaining a radial compression upon the outermost of said units, and placing a retaining covering on said wrapped units, releasing the radial pressure upon said units to place outward pressure upon said retaining covering and secure said covering in part by effecting a binding between the parts of said covering, and sliding said wrapped units axially off said supporting member.

9. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, and wrapping said units successively, one after the other, spirally upon a supporting member while maintaining a radial compression upon the outermost of said units, said units being gradually curved toward the curvature of said supporting member during the compression thereof to effect a substantially uniform compression of said units in a direction at substantially right angles to the surface of said units.

10. The method of baling separate compressible spring units which comprises supporting said units and advancing said units, gradually compressing said units as they advance to a predetermined thickness and state of compression while maintaining the spiral turns of the springs in substantially axial alignment with each other, maintaining said thickness and compression, and wrapping said units successively, one after the other spirally upon a supporting member while maintaining a radial compression upon the outermost of said units, securing one end of a wrapper to said spirally wrapped units, and continuing the wrapping action until said wrapper envelops said wrapped units.

11. A method of baling spring units for mattresses or the like which comprises gradually compressing a spring unit while maintaining the spiral turns of the springs in substantially axial alignment with each other, the spring units being compressed to a fraction of their normal thickness, wrapping a spring unit upon a supporting member to form a substantially cylindrical bale, and covering said spring unit with an exterior covering of sufficient strength to maintain the spring unit baled in substantially cylindrical form.

12. The method of baling a compressible spring unit of the type having a plurality of helical springs, which comprises supporting said unit and advancing said unit, gradually compressing the springs of said unit as said unit advances, to a predetermined thickness and state of compression while maintaining the helical turns of the springs in substantially axial alignment with each other, and maintaining said thickness and compression while wrapping said unit in successive spiral turns upon a supporting member by maintaining a radial compression upon the outermost layer of said unit.

13. The method of baling a compressible spring unit of the type having a plurality of helical springs, which comprises supporting said unit and advancing said unit, gradually compressing said unit as the unit advances, to a predetermined thickness and state of compression by rolling the unit against an opposed surface while maintaining the helical turns of the springs in substantially axial alignment with each other, and maintaining said thickness and compression while wrapping said unit in successive spiral turns upon a supporting member by maintaining a radial compression upon the outermost layer of said unit.

14. The method of baling a separate compressible spring unit of the type comprising a plurality of helical springs, which comprises supporting said unit between two opposed members, first moving said members toward each other to compress said unit to a predetermined thickness and state of compression while maintaining the helical turns of the springs in substantially axial alignment with each other and maintaining said thickness and compression, and then advancing said unit and wrapping said unit in successive layers one after the other spirally upon a supporting member while maintaining a radial compression upon the outermost layer of said unit.

CLARENCE W. LANTER.